April 18, 1933.   C. W. FAUST   1,903,964
SPRING CHUCK
Filed May 2, 1932
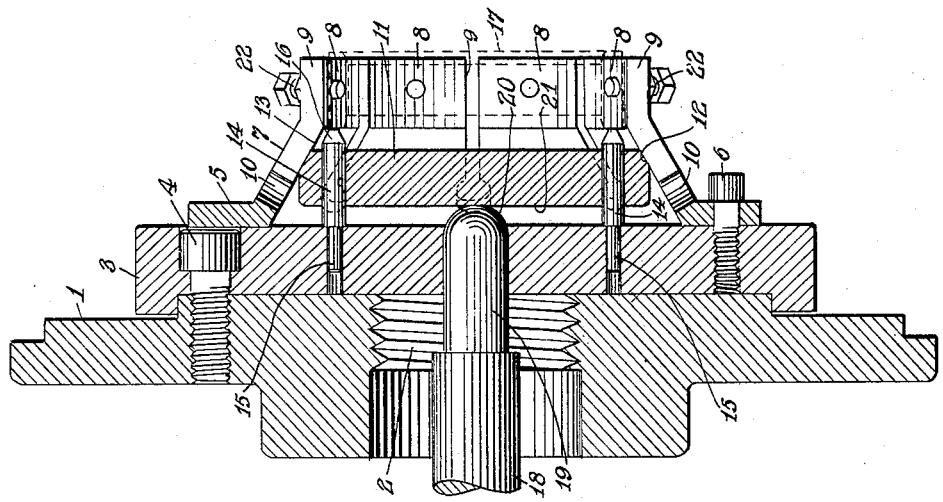
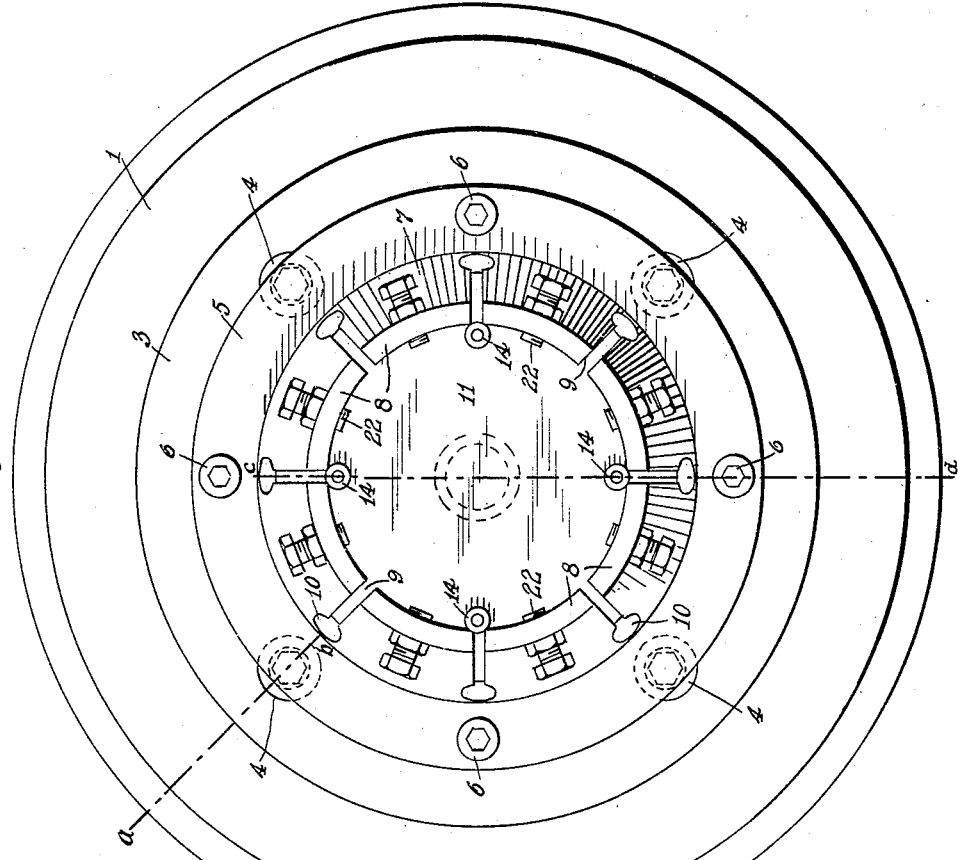
INVENTOR
*Claus Wilhelm Faust*
BY
*Chas. Lyon Russell*
his ATTORNEY Patented Apr. 18, 1933

1,903,964

UNITED STATES PATENT OFFICE

CLAUS WILHELM FAUST, OF ELMWOOD, CONNECTICUT, ASSIGNOR, BY MESNE ASSIGNMENTS, TO THE HESS-BRIGHT MANUFACTURING COMPANY, OF PHILADELPHIA, PENNSYLVANIA, A CORPORATION OF DELAWARE

SPRING CHUCK

Application filed May 2, 1932. Serial No. 608,740.

This invention relates to a chuck in which the work engaging action of the chuck is incident to the springiness or elasticity of the parts and in which the jaws are positively sprung apart to permit the insertion and removal of the work piece, and it has for its object the provision of a jaw member so formed and constructed that it is inexpensive to produce, efficient in operation, and affords a long life in service.

Another object of the invention is to provide pins which serve the dual purpose of guiding the plunger member and acting as back stops for positioning the work piece.

In the drawing accompanying this specification one practicable embodiment of my invention is illustrated, in which drawing:

Figure 1 is a front elevation of the chuck, and Fig. 2 is a section taken on a plane represented by the line a—b—c—d in Fig. 1.

The chuck is shown mounted on a face plate 1 having an internal screw threaded portion 2 for application to the spindle of the machine in which the chuck is to be used. A backing plate 3 is shown secured to the face plate, in the present illustration by means of socket-head cap screws 4. The spring jaw member is shown as formed of a single piece of metal, preferably spring tempered steel, and has a substantially flat annular base portion 5 which is firmly secured to the backing plate 3, in the present instance by means of cap screws 6. The number of these screws which are employed depends largely on the number of arms or fingers which are provided, and also upon the size of the parts and the character of work to be performed on the machine equipped with this chuck. The spring member extends from the base portion 5 in the form of a tapering or conical part 7 continuing at its smaller end in a number of work engaging fingers 8. The fingers are preferably disposed substantially at right angles to the plane of the base portion 5.

The fingers 8 are preferably formed or set off one from the other by means of suitable slots 9 extending from the outer ends of the fingers well into the conical or tapering portion 7. Such slots preferably end in enlarged holes 10.

A wedge or plunger member 11 is mounted within the tapering portion 7 and is furnished with a wedge or cam face 12 for engaging the inner face 13 of the slanting portion 7. This plunger member is shown carried by a plurality of pins 14 which freely pass through holes in the plunger member, and which pins have reduced ends 15 seated in the backing plate 3. For the purpose of economy and convenience the front ends 16 of these pins serve as back stops for the work piece to position it in a fore and aft direction before it is finally engaged by the spring fingers 8. A work piece 17 is shown within the chuck and positioned by these back stops 16.

The wedge member or plunger 11 is preferably advanced by means of a push rod 18 which, in practice, extends back through the spindle of the machine and has a reduced portion 19 which ends in a nicely rounded portion 20 for engaging the rear face 21 of the member 11.

In practice the wedge member or plunger member 11 is positively advanced by means of the pushrod 18, which advance brings its cam face 12 against the inner faces 13 of the tapering portions of the chuck and bends these portions, and with them the fingers 8 outwardly so that the work piece 17 may be placed within the fingers and against the back stop pins 16; whereupon the pressure upon the push rod is then released and the spring parts of the chuck being free to respond to their natural resiliency cause the fingers 8 to engage and securely grasp the work piece 17. This movement of the parts automatically forces the plunger wedge 11 back to its idle position.

The fingers 8 are shown furnished with adjustable work contacting members in the form of screws 22. These screws are preferably trued up by the guiding wheel of the machine after being adjusted.

Although but one form of my invention is herein illustrated, at the present time the preferred form, yet it is to be understood that changes may be made within the scope of the claims without departing from the spirit of the invention.

Having thus described my invention what I claim and desire to secure by Letters Patent is:

1. A chuck comprising a plate, a jaw member formed of a single piece of sheet metal and having a substantially flat annular base portion secured to the plate and having a tapering or conical part its larger end springing from the flat annular base portion and continuing at its smaller end in a number of work engaging fingers, the fingers being set off one from the other by means of slots extending from their outer ends well into the conical or tapering portion, a wedge or plunger member mounted within the tapering portion and furnished with a wedge or cam face for engaging the inner faces of the set off members of the slanting portion, and a push rod extending through the plate and having a rounded end for engaging the rear face of the plunger member.

2. A chuck comprising a plate having an internal screw threaded portion for application to the spindle of a machine, a backing plate, a jaw member formed of a single piece of sheet metal and having a substantially flat annular base portion secured to the said backing plate and having a tapering or conical part its larger end springing from the flat annular base portion and continuing at its smaller end in a number of work engaging fingers, the fingers being set off one from the other by means of slots extending from their outer ends well into the conical or tapering portion, a wedge or plunger member mounted within the tapering portion and furnished with a wedge or cam face for engaging the inner faces of the set off members of the slanting portion, and a push rod extending through the said backing plate and having a rounded end for engaging the rear face of the plunger member.

3. A chuck comprising a face plate having an internal screw threaded portion for application to the spindle of a machine, a backing plate secured to the face plate, a jaw member formed of a single piece of sheet metal and having a substantially flat annular base portion adapted to be secured to the backing plate, means for securing the jaw member to the backing plate, such jaw member having a tapering or conical part its larger end springing from the flat annular base portion and continuing at its smaller end in a number of work engaging fingers, the fingers being set off one from the other by means of slots extending from their outer ends well into the conical or tapering portion, a wedge or plunger member mounted within the tapering portion and furnished with a wedge or cam face for engaging the inner faces of the set off members of the slanting portion, the plunger being provided with a plurality of holes passing through it, a plurality of pins seated in the backing plate and passing through the holes in the plunger for guiding it, the pins extending beyond the position normally assumed by the plunger in its forward movement, the forward ends of the pins constituting back stops for a work piece to position it in a fore and aft direction when it is introduced into the chuck, and a push rod adapted to extend through the spindle of the machine when this is located in the internal screw threaded portion of the face plate, such push rod having a rounded end for engaging the rear face of the plunger member.

Signed at Hartford, Connecticut, this 23rd day of April, 1932.

CLAUS WILHELM FAUST.